R. S. Edwards,
Corn-Planter.
No. 75,883.  Patented Mar. 24, 1868.
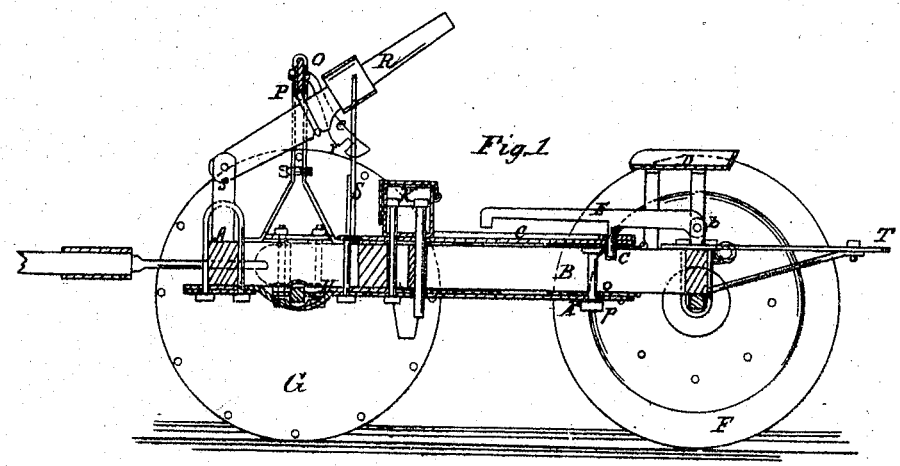
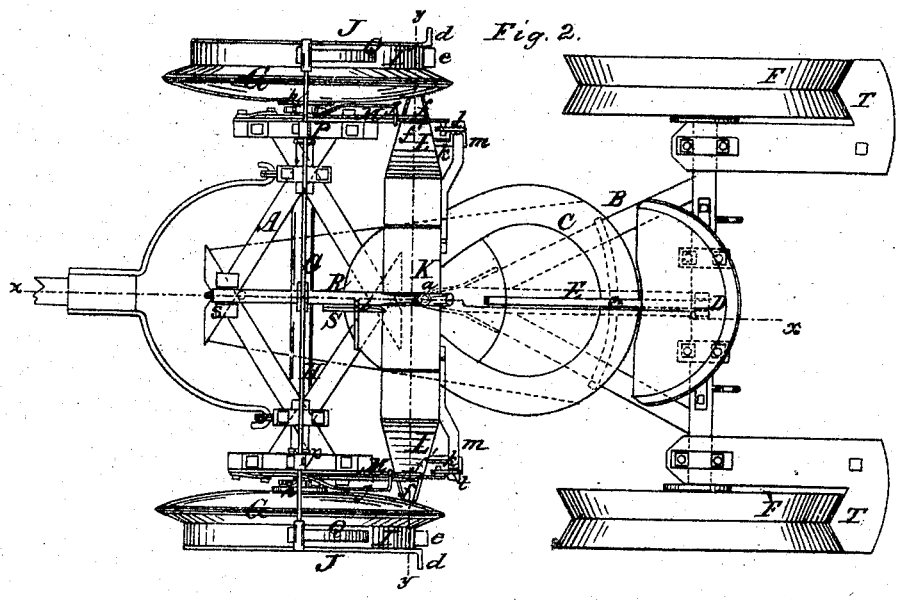
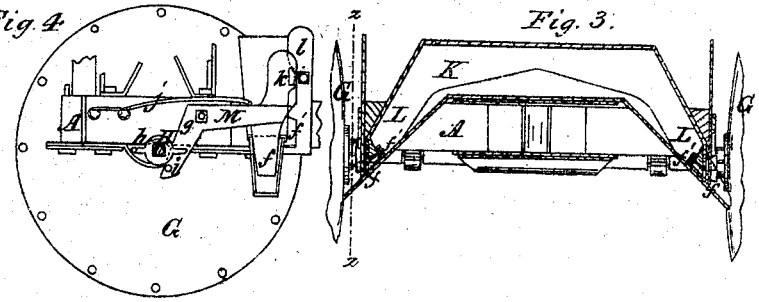

United States Patent Office.

R. S. EDWARDS, OF SAVANNAH, MISSOURI.

Letters Patent No. 75,883, dated March 24, 1868.

IMPROVEMENT IN CORN-PLANTER.

*The Schedule referred to in these Letters Patent and making part of the same.*

TO ALL WHOM IT MAY CONCERN:

Be it known that I, R. S. EDWARDS, of Savannah, in the county of Andrew, and State of Missouri, have invented a new and improved Corn-Planter; and I do hereby declare that the following is a full, clear, and exact description thereof, which will enable those skilled in the art to make and use the same, reference being had to the accompanying drawings, forming part of this specification.

This invention consists in a new and improved seed-distributing apparatus, and in the general construction of the machine, as hereinafter fully shown and described, whereby the feed may be dropped with certainty and evenly in check-rows, and the machine readily manipulated, and all the working parts put under the complete control of the driver or operator. In the accompanying sheet of drawings—

Figure 1 represents a side sectional view of my invention, taken in the line $x\ x$, fig. 2.

Figure 2, a plan or top view of the same.

Figure 3, a transverse vertical section of the same, taken in the line $y\ y$, fig. 2.

Figure 4, a vertical section of fig. 3, taken in the line $z\ z$.

Similar letters of reference indicate corresponding parts.

A represents the front, and B the rear part of the frame of the machine, said parts being connected by a bolt, $a$, to admit of the front axle being turned for the purpose of guiding or turning the machine. To the rear of the front part, A, of the machine there is attached a circular metal plate, C, which serves as a foot-board for the driver on seat D, the latter being on the rear of the part B of the frame, said part B having an arm, E, attached to it by a joint $b$, which allows the arm to work up and down in a vertical plane. This arm E is provided with a pendent pin, $c$, which, when the arm is adjusted downward, fits in a hole in plate C, and keeps the two parts, A B, rigidly connected, so that the front axle cannot turn, (see fig. 1.) A plate, $A^\times$, is also attached to the under side of the front part, A, of the frame, said plate extending back under the rear part, B, and having a segment-slot, $o$, made in it, through which a bolt, $p$, in the rear part of the frame, passes. This bolt and segment-slot serve as a guide for the front part, A, of the frame of the machine as the latter is turned. The rear part, B, of the frame is supported by two wheels, F F, the peripheries of which are grooved in V-form, to serve as coverers, (see fig. 2.) The front part, A, of the frame is supported by two wheels, G G, which are attached rigidly to their axle H, the latter being allowed to turn in suitable bearings.

The wheels G have their edges or peripheries made in V-form, as shown in fig. 2, in order to make or open the furrows which receive the seed; and in order to prevent said wheels sinking too deep into the earth, and making the furrows unnecessarily deep, concentric flanges, I, are formed on or attached to the outer sides of the wheels. On each end of the axle H, at the outer sides of the flanges I, there is secured a bar, J, and these bars at one end are bent outward, as shown at $d$, to serve as markers to point out the spots where the seed is deposited, and on the peripheries of the flanges I are secured lugs or projections $e$, two on each, at opposite sides of their centres. The use of these will be presently shown.

On the front part of the plate C there is secured transversely a seed-box, K, having at each end an inclined spout, L. These spouts extend downward, so as to be nearly in contact with the rear parts of the wheels G G, as shown in fig. 3. In the lower part of each spout L there are fitted two valves, $f\ f'$, the former, $f$, working vertically, and the latter, $f'$, working laterally. The valves $f$ are attached to one end of levers M, the fulcrum-pins $g$ of which pass into the ends of the parts of the frame of the machine, and the lower ends of these levers, as the machine is drawn along, are acted upon by cams or wipers, $h$, on the axle H, the cams or wipers acting against pins $i$, which project from said levers M. The cams or wipers raise the valves $f$, and the latter are lowered by springs $j$ bearing upon them. The upper parts of the valves $f$ have pins, $k$, projecting horizontally from them, and these pins, as the valves $f$ are raised, act against inclined surfaces of levers $l$, which are fitted on horizontal arms $m$, attached to the rear of the seed-box. The lower parts of these levers $l$ have each a valve, $f'$, attached, and each time the valves $f$ are raised, the valves $f'$ are forced inward, so as to prevent the discharge of seed from the spouts L, a space being allowed between the two valves to receive a dropping of seed. When the valves $f$ are closed under the pressure of the springs $j$, the valves $f'$ are opened, and the valves $f'$ close as the valves $f$ are opened, and hence it will be seen that at each dropping the quantity of seed contained between the two valves $f\ f'$ is discharged. In turning at the ends of rows, it is necessary to stop the revolutions of the front wheels G G, in order to prevent the dropping or distribution of seed, and admit of the seed in the succeeding rows being dropped in line with the hills of the preceding rows. This is effected by means of a horizontal bar, O, which works in guides P P on the front part A of the frame of the machine, an arm, Q, being attached to each end of the bar O, and said arms having each a notch, r, made in them, to catch and receive one of the lugs or projections e on the flanges I. The bar O is attached to a lever, R, which has its fulcrum-pin in an upright, s, on the front part, A, of the frame of the machine. By means of this lever the bar O may be raised so that the notched arms Q will be above and free from the lugs or projections e of the flanges I, a notched upright bar, S, being attached to the front part, A, of the frame, to hold the lever R in an upward and downward position. The wheels F F, which cover the seed, are kept perfectly clean or free from dirt, by means of scrapers T, shown clearly in fig. 2.

I claim as new, and desire to secure by Letters Patent—

1. Constructing the frame of the machine of two parts, A B, connected by a bolt, a, in connection with the arm E, on part B, provided with the pendent pin c, to fit in the plate C of the part A, all arranged substantially as and for the purpose set forth.

2. The seed-distributing device, consisting of the two valves $ff'$, in the spouts L of the seed-box K, arranged as shown, and operated by the levers M, and the cams or wipers h, from the front axle H, substantially as shown and described.

3. The adjustable horizontal bar O, connected with the lever R, and provided with the notched arms Q, in combination with the lugs or projections e, on the flanges I of the wheels G G, all arranged substantially as and for the purpose specified.

R. S. EDWARDS.

Witnesses:
    JOHN VANBUSKIRK,
    JOHN B. MAJORS.